Aug. 26, 1969    G. F. MEYER    3,463,374
WIRE THREADER IN AN ELECTRIC WELDING APPARATUS
Filed Dec. 5, 1967    3 Sheets-Sheet 1
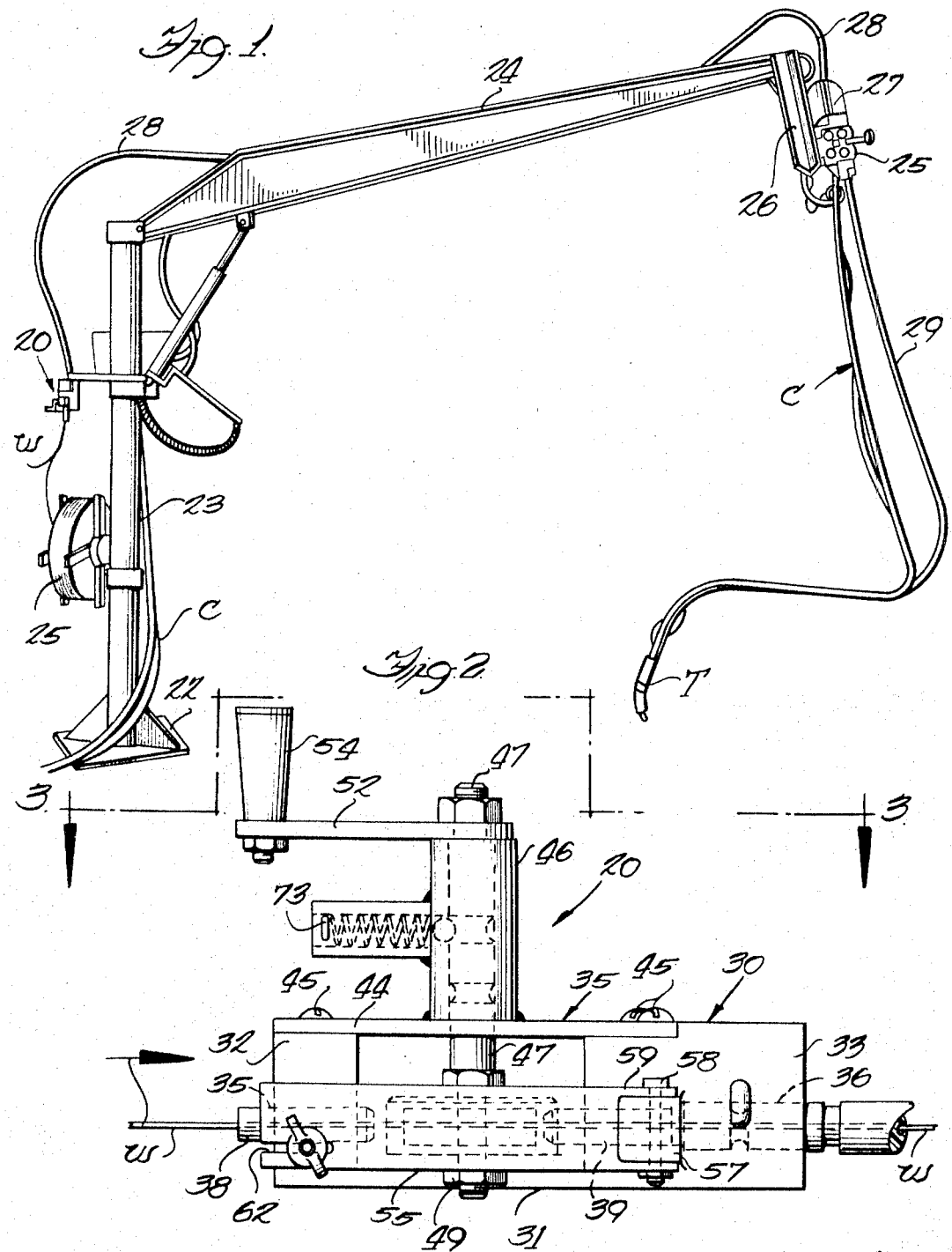
Inventor
Gilbert F. Meyer
Pendleton, Newman
by Seibold & Williams
Att'ys

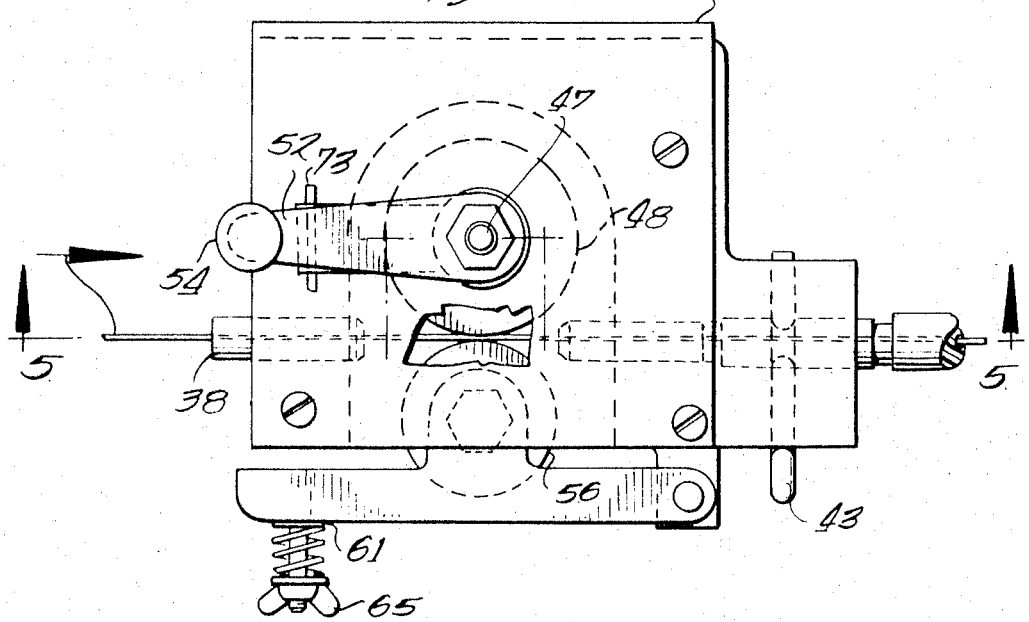
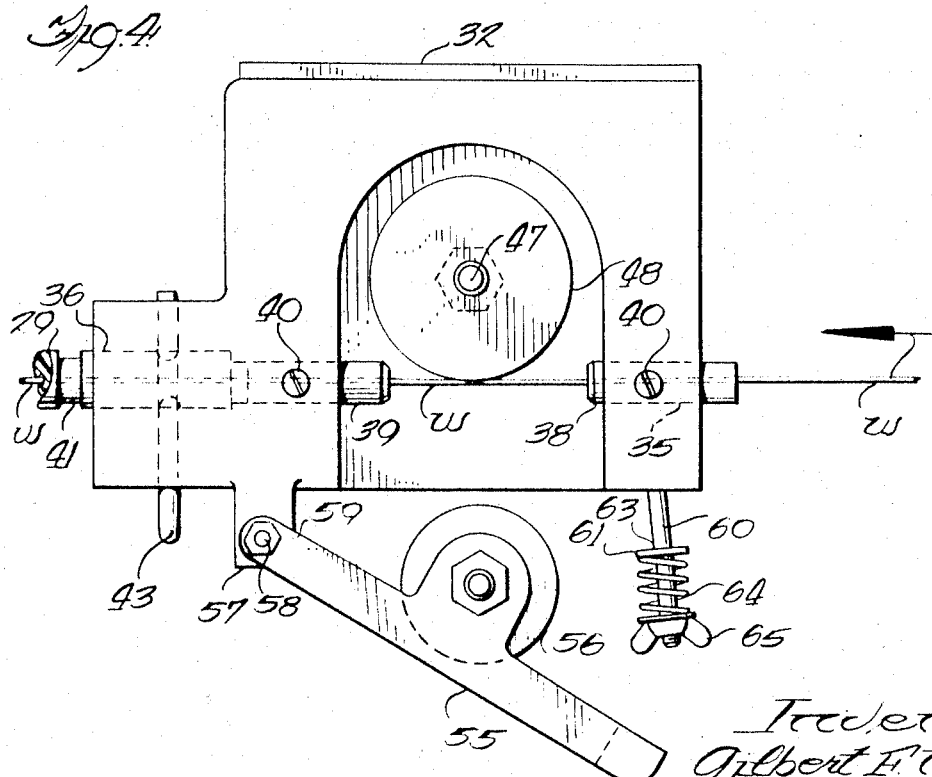

Aug. 26, 1969  G. F. MEYER  3,463,374
WIRE THREADER IN AN ELECTRIC WELDING APPARATUS
Filed Dec. 5, 1967  3 Sheets-Sheet 3

Inventor
Gilbert F. Meyer
by Pendleton, Neuman,
Seibold & Williams
Atty's

United States Patent Office 3,463,374
Patented Aug. 26, 1969

3,463,374
WIRE THREADER IN AN ELECTRIC WELDING APPARATUS
Gilbert F. Meyer, Greendale, Wis., assignor to Machinery and Welder Manufacturing Corporation, Greendale, Wis., a corporation of Wisconsin
Filed Dec. 5, 1967, Ser. No. 688,138
Int. Cl. G03b 1/56; B65h 17/20
U.S. Cl. 226—91            10 Claims

ABSTRACT OF THE DISCLOSURE

Wire threader for an electric welding apparatus for threading welding wire through a flexible conduit wherein the threader includes a body member carrying a drive shaft having a drive roll and a pressure roll mounted thereon. Detent means is provided on the drive shaft for cooperating with transverse positioning means for holding the drive roll relative to the body member, so that after the wire has been threaded the desired distance, the drive roll may be transversely moved out of contact with the wire and away from the pressure roll.

Background of the invention

The field of the invention relates to wire threaders for electric welding apparatus. In such apparatus utilizing continuous welding wire it is necessary, prior to the operation of the welder, to thread the welding wire from a reel to a feeding mechanism and it has been found that threading by hand is quite time consuming and inefficient. In welders wherein the distance between the reel and the feeding mechanism is appreciable, the need for an efficient and quick means for threading the welding wire through the flexible conduit is apparent.

The subject invention provides a simple and inexpensive solution to the indicated problem, whereby the overall efficiency of the welding operation is increased.

Summary of the invention

It is an object of the invention to provide an improved wire threader for threading welding wire through a flexible conduit of considerable length in an electric welding apparatus.

A further object is to provide an improved wire threader of the character indicated which is simple in form, easy to manufacture and efficient in operation.

Other objects and advantages will become apparent as the description proceeds.

In carrying out the invention, in one form a welding wire threader is provided which comprises a body member having a base portion, two upstanding side portions and a rear wall, each of the side portions having a longitudinally extending aperture therethrough for receiving welding wire, a bearing housing mounted on said rear wall, a drive shaft slidably disposed in the bearing housing for transverse and rotational movement with respect to the body member, said shaft having a drive roll rigidly secured at one end thereof; the bearing housing having means associated therewith operable for selective transverse positioning of the drive shaft relative to the body member between wire engaging and wire free positions, drive means attached to the drive shaft for rotating the drive roll, and support means mounted on the body member having a pressure roll mounted thereon adapted to be in alignment with the drive roll and adapted to contact welding wire as it is threaded.

Brief description of the drawings

FIGURE 1 is a perspective view of welding apparatus employing a wire threader embodying the invention;

FIG. 2 is a plan view of the wire threader embodying the invention;

FIG. 3 is a rear elevational view, partly broken away, taken substantially in the direction of arrows 3—3 of FIG. 2;

FIG. 4 is a front elevational view of the wire threader embodying the invention;

Description of the preferred embodiment

Figure 6:
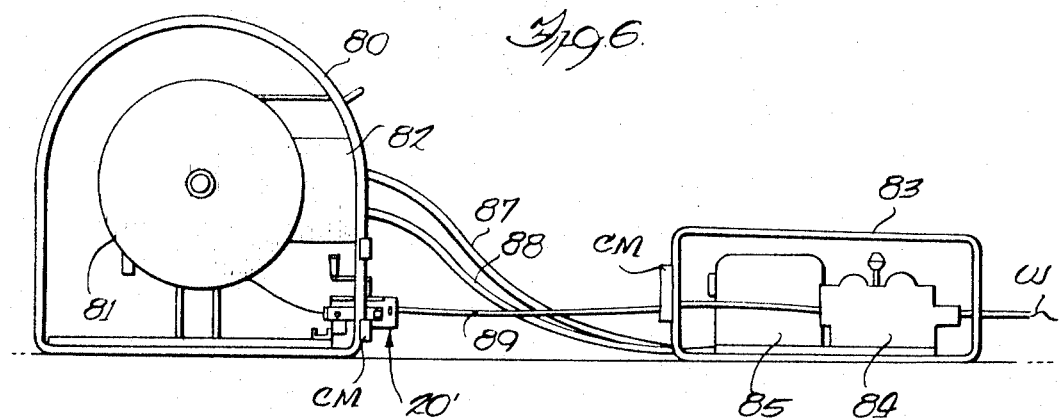
FIG. 6 is an elevational view of another welding apparatus employing a wire threader embodying the invention.

Referring more particularly to the drawing, one form of electric welding apparatus is shown in FIG. 1 including a wire threader 20 according to the invention. The wire threader is shown in FIG. 6 with another form of electric welding apparatus.

Other features of the welding apparatus such as the feeding mechanism which supplies the welding wire to a torch are disclosed in the application of the same inventor, Ser. No. 659,281, filed July 21, 1967, entitled "A Welding Wire Feeding Mechanism for Continuous Welding Apparatus," the subject invention residing in an improved wire threader.

In FIG. 1 a boom welder is shown carrying welding equipment and comprises a base support 22, an upright post member 23 secured thereto, and a boom 24 extending upwardly and outwardly from the upper portion of upright post member 23. A wire carrying reel 25 is rotatably mounted on post member 23, and above the reel, a wire threader 20 of the subject invention is suitably mounted. At the extremity of boom 24 a drive mechanism 25 (disclosed in Ser. No. 659,281) for pulling wire through the apparatus to a torch T is mounted on support platform 26 along with a drive motor 27 for driving the mechanism. Appropriate cables and conduits C carrying current and gas to the torch, a flexible conduit 28 extending from wire threader 20 to the drive mechanism 25, and a flexible conduit 29 extending from the drive mechanism to the torch T are provided.

Prior to the welding operation it is necessary to thread welding wire W from the reel to the drive mechanism 25 whereafter the drive mechanism pulls the wire through and feeds it to the torch. Since the conduit extending between the reel and the drive mechanism is generally several feet in length, pushing the wire therethrough by hand would be quite time-consuming and would constitute a delay in the welding operation. The wire threader of the subject invention eliminates this disadvantage and accomplishes threading of the welding wire in a quick and efficient manner with a minimum of delay.

Referring to FIGS. 2–5, the wire threader comprises a body member 30 having a base portion 31, two upstanding side portions 32 and 33, respectively, and a rear wall 34. Side portions 32 and 33 have longitudinally extending apertures 35 and 36, respectively, therethrough in which guide members 38 and 39, respectively, are disposed. The guide members are held in place by set screws 40. As shown in FIG. 4, guide member 39 extends only partially through aperture 36, an adapter 41 being partially disposed in aperture 36 and extending outwardly therefrom where it abuts flexible conduit 28. Adapter 41 has a peripheral groove 42 intermediate its ends whereby it is held within aperture 36 by a cotter pin 43.

Rear wall 34 includes a cover plate 44 which is secured to body member 30 by screws 45. A bearing housing 46, which may comprise a hollow cylindrical member, is welded to cover plate 44. Disposed within housing 46 is a drive shaft 47, which has a knurled drive roll 48 secured thereto at one end thereof by a nut 49. The diameter of the drive shaft intermediate its ends is larger than the diameter at the ends so that shoulders 50 and 51 are provided at the respective ends, and drive roll 48 is held abutting shoulder 50 by nut 49 threaded on shaft 47.

A crank, including an arm 52 and handle 54, for rotating drive roll 48 is attached to drive shaft 47 and abuts shoulder 51 and is held in place by nut 53 threaded on shaft 47. The handle may be turned manually by a workman with relative ease.

In order to apply pressure on the wire and on the drive roll so that the wire may be threaded, a bracket 55 is provided which has a pressure roll 56 supported thereby. A lug 57 extending from the body member 30, and a bolt 58 serve as a pivotal connection for lateral extensions 59 at one end of bracket 55 so that the bracket may pivot outwardly out of engagement with the welding wire as shown in FIG. 4. At the other end of the bracket, a spring mechanism is provided for causing roll 56 to exert pressure on the wire. Thus, a rod 60 is pivotally secured to the body so as to be longitudinally movable, a washer 61 abuts a shoulder 63 on rod 60, a helical spring 64 surrounds the rod, and contacting one end of the spring is a wing nut 65 threaded on rod 60 for urging washer 61 against bracket 55.

The bracket 55 has a slot 62, as shown in FIG. 2, and rod 60 is adapted to be received therein. Wing nut 65 varies the compression of spring 64 and thus varies the pressure of rolls 56 and 48 against the wire as it is threaded through guide members 38 and 39 by drive roll 48. Should it become necessary to disengage bracket 55, the operator may simply push rod 60 out of engagement with the edges of slot 62, whereby the bracket may be easily pivoted away.

Once the welding wire W has been threaded through the mechanism, it is necessary to disengage the drive roll 48 from contact with the welding wire to avoid placing an external load on the drive mechanism 25 as it pulls the wire through the welding apparatus. This objective is achieved simply and efficiently. Shaft 47 is provided with two transversely spaced peripheral grooves 66 and 67 for receiving a ball 70 which is disposed within an aperture 69 in housing 46.

Figure 5:
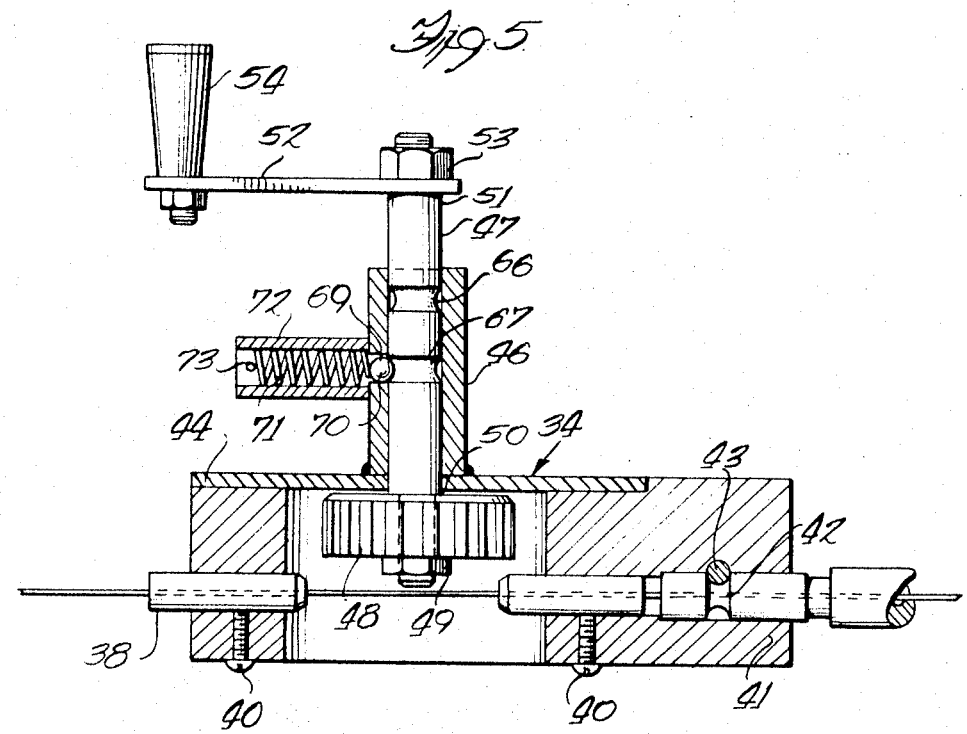
FIG. 5 is a sectional view taken along line 5—5 of FIG. 3.

Ball 70 is urged into contact with either of the grooves by a spring 71 disposed within a cylindrical member 72 which is welded to housing 46 as shown in FIG. 5, a cotter pin 73 being provided as shown to hold spring 71 in place. Hence, the shaft 47 and the attached drive roll 48 may be easily moved out of contact with the welding wire after the wire has been threaded by simply pulling the handle arm 52 rearwardly so that the ball moves from groove 66 into groove 67.

In FIG. 6 a separable welding feeder assembly is shown in which the wire threader of the subject invention may be utilized. The assembly includes a frame member 80 having a welding wire-carrying reel 81 mounted thereon, a control box 82 and wire threader 20' carried by frame member 80 at the forward portion thereof. The assembly further includes a second frame member 83 which supports a drive mechanism 84 and a drive motor 85 therefor, both shown in outline only. The frame members may be separably joined by connecting means CM which is the subject matter of a copending application Ser. No. 685,879 by the same inventor, entitled Wire Feeding Assembly for an Electric Welding Apparatus, and forms no part of the invention in the subject case.

Cables 87 and conduits 88 extend from frame member 80 to their respective connections on frame member 83, and a flexible wire carrying conduit 89 extends from wire threader 20' to the drive mechanism 84 on frame member 83.

The wire threader 20' is used in the separable welding feeder assembly when the frame members are disengaged from each other and longer conduits and cables are substituted for the original conduits and cables. In such a case it is necessary to thread the wire from the reel to the drive mechanism which is located generally a considerable distance (for example, up to 35 or 40 feet) from the wire threader.

In order to more fully appreciate the invention, the operation thereof may now be described. Initially, the hinged bracket 55 is swung into the position shown in FIG. 3 and the wing nut 65 is tightened an amount as may be appropriate. Drive shaft 47 is then slid transversely so that ball 70 disengages the groove 67 and engages the groove 66. The periphery of drive roll 48 is thus in contact with the periphery of pressure roller 56. Then, the wire is manually pushed through guide member 38 and into the bight between rolls 48 and 56. The crank 54, 52 is turned and the roll 48 pushes the wire W into and through guide 39 and through wire conduit 89 to wire feeder 84. If additional pressure on pressure roll 56 is needed for exerting a greater force on the wire the wing nut 65 may be tightened further.

After the wire has been threaded, drive shaft 47 is slid rearwardly so that ball 70 disengages groove 66 and engages groove 67 whereby the roll 48 moves free of the wire. Bracket 55 may be disengaged and swung outwardly although it may not be necessary to do so since contact between the wire and the roll 56 does not add appreciably to the frictional forces involved.

It is thus seen that a wire threader has been provided which is capable of threading welding wire through a flexible conduit of considerable length in a simple and efficient manner.

While a particular embodiment of the invention has been shown; it is to be understood that the invention is not limited thereto since many minor modifications may be made which are within the true spirit and scope of the invention.

The invention having thus been described, what is claimed and desired to be secured by Letters Patent is:

1. A wire threader for continuous wire feeding electric welding apparatus comprising a body member having a base portion, two upstanding side portions and a rear wall, each of said two side portions having a longitudinally extending aperture therethrough for receiving welding wire, a bearing housing mounted on said rear wall, a drive shaft slidably disposed in said bearing housing for transverse and rotational movement with respect to said body member, said shaft having a drive roll rigidly secured at one end thereof; said bearing housing having means associated therewith operable for selective transverse positioning of the drive shaft relative to the body member between wire engaging and wire free positions, drive means attached to said drive shaft for rotating the drive roll, and support means mounted on said body member having a pressure roll mounted thereon adapted to be in alignment with said drive roll and adapted to contact welding wire as it is threaded.

2. The invention according to claim 1 wherein the drive shaft has detent means thereon and the means associated with said bearing housing cooperates therewith to provide for transverse positioning of the drive roll.

3. The invention according to claim 2 wherein the bearing housing has an opening and the means associated with said bearing housing includes a ball which is disposed in said opening and is adapted to engage the detent means on said drive shaft.

4. The invention according to claim 3 wherein the detent means comprises first and second transversely spaced peripheral grooves on said drive shaft whereby two transverse positions for said drive shaft relative to the body member are provided.

5. The invention according to claim 3 wherein the means associated with said bearing housing further includes a housing having a biasing means therein for urging said ball into engagement with the detent means on said drive shaft.

6. The invention according to claim 5 wherein the detent means comprises first and second transversely spaced peripheral grooves on said drive shaft whereby two transverse positions for said drive shaft relative to the body member are provided and the drive roll may be transversely moved into and out of vertical alignment with the upper roll by sliding the drive shaft forwardly so that the ball engages the second groove and rearwardly so that the ball means engages the first groove, respectively.

7. The invention according to claim 1 wherein the drive means is a hand crank rigidly secured to the drive shaft.

8. The invention according to claim 1 wherein the support means comprises a bracket hingedly mounted on said body member at one end thereof and resiliently held in position at the other end thereof by a biasing means whereby said casing means may be repositioned by disengaging the biasing means from the bracket and rotating the bracket outwardly.

9. The invention according to claim 8 wherein the bracket has a generally U-shaped slot at the end opposite the hinged end, and the biasing means includes a rod movably attached to said body member and a spring mounted thereon whereby the the support means may be easily repositioned by sliding the rod out of engagement with the slot and rotating the bracket outwardly.

10. The invention according to claim 1 wherein the drive roll is knurled.

References Cited
UNITED STATES PATENTS

| | | | |
|---|---|---|---|
| 3,016,451 | 1/1962 | Cornell | 226—190 X |
| 3,353,791 | 11/1967 | Warshawsky | 254—134.3 |

M. HENSON WOOD, Jr., Primary Examiner

RICHARD A. SCHACHER, Assistant Examiner

U.S. Cl. X.R.

226—154, 179; 254—134.3